United States Patent [19]
Oshima

[11] Patent Number: 5,242,626
[45] Date of Patent: Sep. 7, 1993

[54] PROCESS FOR CONTACTING GAS AND LIQUID

[75] Inventor: Katsutoshi Oshima, Tokyo, Japan

[73] Assignee: Zaidan Hojin Nanyo Kyokai, Tokyo, Japan

[21] Appl. No.: 851,993

[22] Filed: Mar. 13, 1992

[30] Foreign Application Priority Data

Mar. 14, 1991 [JP] Japan .................. 3-074575

[51] Int. Cl.⁵ ................................. B01F 3/04
[52] U.S. Cl. .................. 261/94; 261/DIG. 72; 55/233; 95/216
[58] Field of Search .............. 261/94, 98, DIG. 72; 55/233; 95/216

[56] References Cited

U.S. PATENT DOCUMENTS

| | | | |
|---|---|---|---|
| 2,360,669 | 10/1944 | Goethel | 261/98 |
| 2,431,455 | 11/1947 | Blanding | 261/98 |
| 2,676,670 | 4/1954 | Gagnaire | 261/98 |
| 2,819,887 | 1/1958 | Eversole et al. | 261/94 |
| 3,293,174 | 12/1966 | Robjohns | 261/94 |
| 3,364,656 | 1/1968 | Whiton et al. | 55/91 |
| 3,409,279 | 11/1968 | Metrailer | 55/91 |
| 3,410,057 | 11/1968 | Lerner | 261/DIG. 72 |
| 3,560,167 | 2/1971 | Bruckner et al. | 261/94 |
| 3,666,405 | 5/1972 | Winsel | 261/94 |

FOREIGN PATENT DOCUMENTS 429616 6/1935 United Kingdom ............ 261/94

Primary Examiner—Tim Miles
Attorney, Agent, or Firm—Marshall & Melhorn

[57] ABSTRACT

In a process for contacting gas and liquid, gas and liquid are simultaneously passed through a layer of irregularly shaped pieces of foamed plastic material having diameters in a range between 1 mm and 50 mm. Since the gas and the liquid are passed through a contact region filled with particles of foamed plastic material, persistence of fine bubbles is increased due to the generation of flow turbulence preferably combined with high pressure. Further, the foamed plastic particles have a low specific weight and is highly durable, it can be used for an extended period of time without losing its processing capability.

4 Claims, 3 Drawing Sheets

PROCESS FOR CONTACTING GAS AND LIQUID

TECHNICAL FIELD

The present invention relates to a process for achieving a contact between gas and liquid within a vessel.

BACKGROUND OF THE INVENTION

Conventionally, processing of utility and sewage water has often made use of a contact between gas and liquid in a container for the purposes of improving the efficiency of biological membrane processes by increasing the content of dissolved oxygen, and speeding up the decomposition of residual ozone. Similar processes have also been used for absorbing and removing various odorous substances from gas.

Typical methods for achieving such contact includes the method of pressurizing the interior of a vessel, and feeding air bubbles into the solution contained in the vessel with the aim of increasing the oxygen content in the solution. Pressurizing the interior of such a vessel can be achieved by using a jet flow or an ejector.

According to such methods, the air bubbles are broken into fine bubbles immediately after the pressurization and a favorable contact is established between the air and the liquid, but the bubbles have a tendency to grow into larger bubbles in time, and the increase in the oxygen content is often not sufficient for the specific purpose. It has also been conventionally practiced to fill the vessel with chamotte, anthracite and other natural minerals, inorganic foam materials, and molded synthetic resin materials, and pass the gas and the liquid through this vessel for the purpose of improving the contact between the gas and the liquid.

However, when natural minerals are used as a contact material, their particle diameters are so small and their gravitational weights so great that the gas would not be evenly distributed and mud balls tend to be generated, thus forming paths for liquid flow and reducing the efficiency of contact between the gas and the liquid. When natural foamed mineral material is used for the contact material, the particles of the contact material are too large, and the surfaces of contact material are prone to wear, which likewise has a detrimental effect on the efficiency of contact between the gas and the liquid.

When molded plastic pieces are used as the contact material, the turbulence of the flow is not so much as desired because the space between the particles is excessive and the particles have a uniform shape so that the efficiency of contact is not very high.

When odorous substances are desired to be removed from gas, according to a known process of contact between gas and liquid, the liquid is sprayed from an upper part of the vessel while the gas is introduced from a lower part of the vessel. In this case, metal mesh and Raschig ring are widely used as the contact materials. In either case, it is not possible to achieve a sufficiently high processing capability because the wire mesh simply restricts the gas flow without creating any substantial turbulence and the Raschig ring has an excessively large ratio of vacant space and has a highly uniform shape.

BRIEF SUMMARY OF THE INVENTION

In view of such problems of the prior art, a primary object of the present invention is to provide a novel process for improving contact between gas and liquid.

This and other objects of the present invention can be accomplished by providing a process for contacting gas and liquid, comprising the steps of: forming a typically horizontal layer of irregularly shaped pieces of foamed plastic material having diameters in a range between 1 mm and 50 mm; and passing the gas and the liquid simultaneously through the layer.

Since the gas and the liquid are passed through a contact region filled with particles of foamed plastic material, persistence of fine bubbles is increased due to the generation of flow turbulence preferably combined with high pressure. Further, the foamed plastic particles have a low specific weight and is highly durable, it can be used for an extended period of time without losing its processing capability.

Preferably, the gas and the liquid are simultaneously passed through the layer under a pressure higher than an atmospheric pressure. Preferably, the gas may be passed upward through the layer while the liquid is passed downward through the layer.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
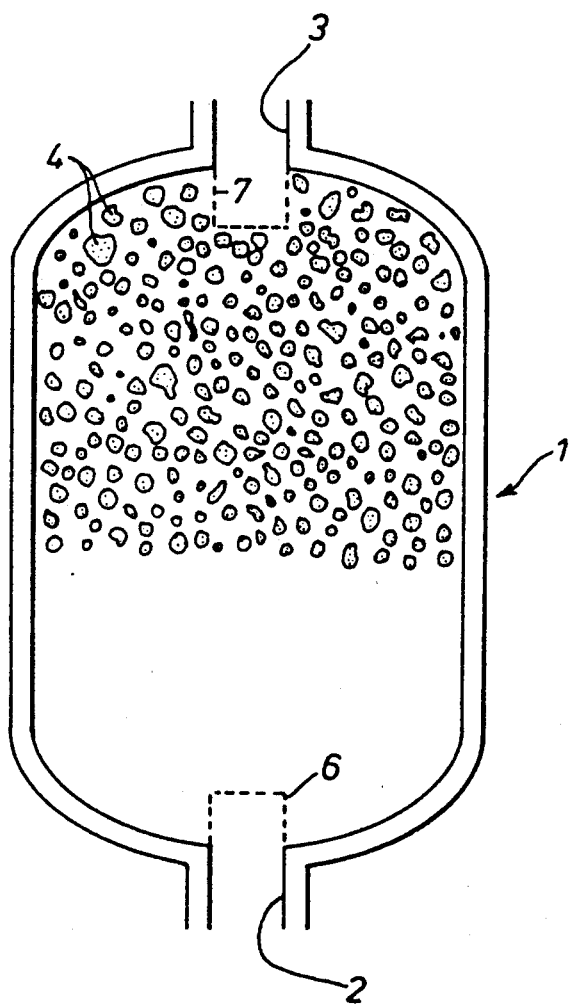
FIG. 1 is a sectional side view of a pressure vessel for implementing a first embodiment of the present invention.

FIG. 1 is a sectional side view of a pressure vessel 1 for implementing a first embodiment of the present invention. This vessel 1 is provided with an inlet for gas and liquid in a lower part of thereof, and an outlet for gas and liquid in an upper part thereof. The interior of the pressure vessel 1 is 10 to 90% filled with contact material 4 consisting of irregularly shaped pieces of foamed synthetic resin or plastic material having particle diameters in the range of 1 to 50 mm. The inlet 2 and the outlet 3 are provided with screens 6 and 7 for preventing the contact material 4 from flowing out of the vessel 1. The particle diameters of the contact material 4 are selected in this range because the mesh of the screens would have to be so fine that the screen would cause an excessive flow resistance if the particle diameter is less than 1 mm and the contact material would have an unacceptably small contact surface area if the particle diameter is greater than 50 mm.

To achieve a desired contact between gas and liquid, the liquid and the gas are introduced from the inlet 2 into the pressure vessel 1 by applying pressure in the range of 0.1 to 0.7 kgf/cm² which is higher than the atmospheric pressure. As the gas and liquid pass through the contact material 4, a turbulent flow is formed, and the high pressure existing in the pressure vessel promotes the dissolution of the gas in the liquid. As a result, liquid containing a large percentage of gas is ejected from the outlet 3. In this case, the gas and liquid are substantially completely mixed, and the increase in the size of gas bubbles due to the reduction in pressure can be avoided.

As a practical aerobic biological process, there is the simple pressurization process which makes use of a pressurized flotation process in a vessel similar to that of the first embodiment, however, without using the contact material. According to this simple pressurization process, the bubbles quickly increased their size following the reduction in pressure form the pressure level of 2 kgf/cm² with an initial oxygen concentration level of 10 mg/liter. However, according to the process of the first embodiment, the bubbles remained so fine that a cloudy or opaque appearance indicative of the presence of extremely fine gas bubbles was obtained by a similar reduction in pressure from the same pressure level even with a slightly higher initial oxygen concentration level of 15 mg/liter.

Figure 2:
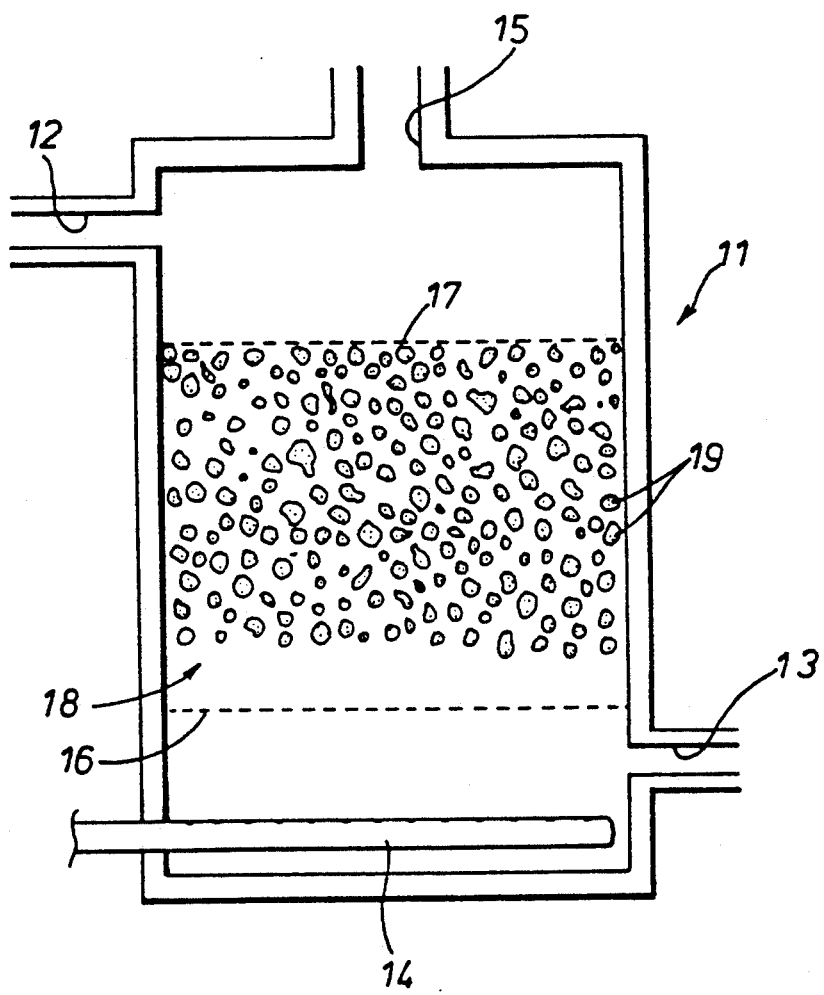
FIG. 2 is a sectional side view of a pressure vessel for implementing a second embodiment of the present invention.

FIG. 2 is a view similar to FIG. 1 showing a second embodiment of the present invention. The vessel 11 is provided with an inlet 12 for liquid in an upper part thereof, an outlet 13 for liquid in a lower part thereof. The vessel 11 is further provided with a gas ejection head 14 in a lower part thereof, and a gas outlet 15 in an upper part thereof.

In the vessel 11 is defined a contact material layer 18 which is delimited from above and below by screens 16 and 17 for confining the contact material in this region, and this layer contains contact material 19 consisting of small pieces of foamed plastic material having irregular shapes and sizes which range between 1 mm and 50 mm in diameter in such an amount that the material fills 10 to 90% of the region.

In carrying out the contact between gas and liquid, liquid is introduced into the vessel 11 from the inlet 12, and gas is ejected from the gas ejection head 14 at the same time. Therefore, the gas and the liquid contact each other in a counter flow. In this case, since the liquid flow urges the contact material 19 downward, the upper screen 17 may be omitted.

Tests were conducted as described hereinafter for the purpose of comparing the process of the second embodiment of the present invention with the conventional process using anthracite, inorganic foamed material and molded plastic pieces having a uniform diameter, by actually carrying out an actual aerobic biological process. BOD and COD load tests were conducted by using a vessel measuring 300 mm in diameter and 5,000 mm in height with a contact layer thickness of 3 m. The BOD level of the unprocessed water was 200 mg/liter.

TABLE 1

| | BOD load kg/m²/day | BOD cut ratio | remarks |
|---|---|---|---|
| present invention | 6 | 95% | high-load continuous operation |
| anthracite process | 6 | — | load must be less than 1.2 kg/m²/day |
| inorganic foamed material process | 6 | 82% | high-load operation possible |
| molded plastic process | 6 | 70% | but low cut ratio |

Further, injection of ozone for the purpose of deodorization and sterilization was conducted by simply injecting ozone on the one hand and combining it with the process of the second embodiment of the present invention on the other hand. The present invention achieved an improvement of approximately 30% in reaction efficiency of ozone over the simple process.

Figure 3:
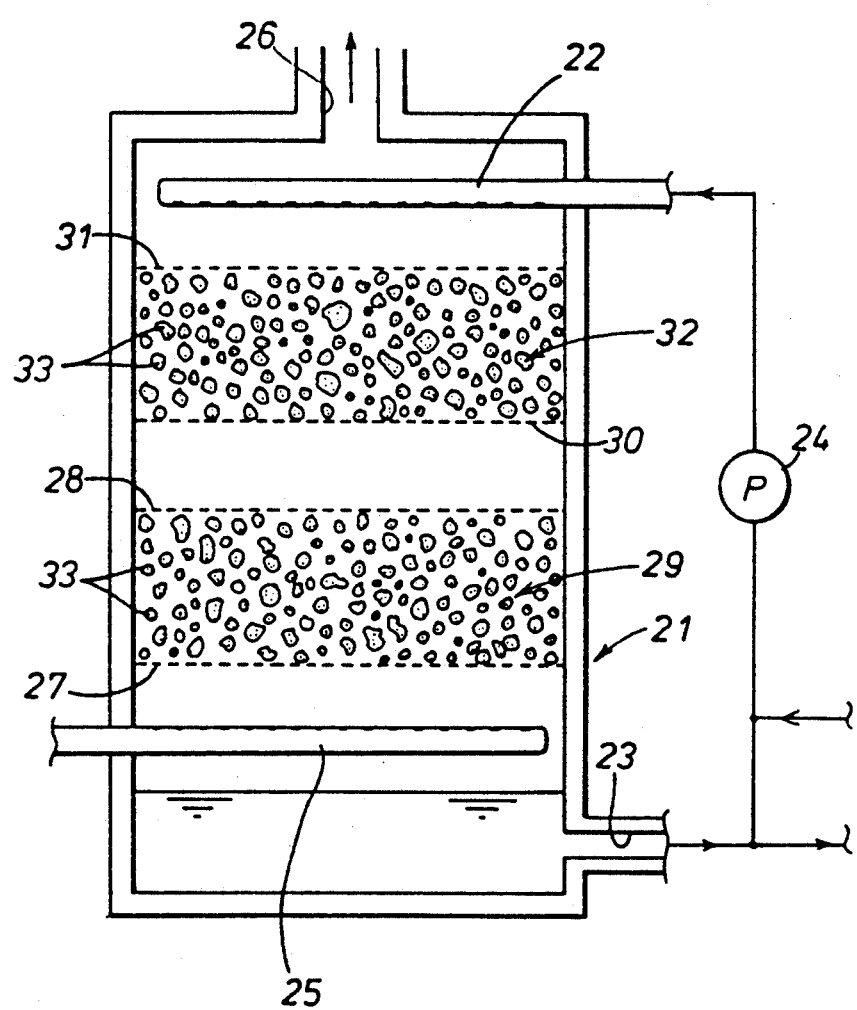
FIG. 3 is a sectional side view of a pressure vessel for implementing a third embodiment of the present invention.

FIG. 3 is a view similar to FIGS. 1 and 2 showing a third embodiment of the present invention which is useful in deodorizing and oxidizing a large volume of gas. The vessel 21 is provided with a liquid spray head 22 in an upper part thereof, and a liquid outlet 23 in a lower part thereof. The liquid outlet 23 is connected to the liquid spray head 22 via a pump 24, and the liquid in the vessel 21 may be recirculated and supplemented or replaced as required.

A gas injection head 25 similar to that of the second embodiment is provided in a lower part of the vessel 21, and a gas outlet 26 is provided in an upper part of the vessel 21.

The vessel 21 contains a lower contact material layer 29 delimited by a pair of screens 27 and 28 for confining the filter material 33 within the given region, and an upper contact material layer 32 delimited by a pair of screens 30 and 31 for confining the filter material 33 within the given region. Each of the filter layers 29 and 32 is 10 to 90% filled with the contact material 33 consisting of foamed plastic pieces which are irregular in shape and size with its diameters ranging between 1 mm and 50 mm.

In conducting the process of contacting gas and liquid, the liquid is introduced into the vessel 21 from the liquid spray head 22, and the gas is injected from the injection head 25. Thus, the liquid and the gas contact each other inside the filter layers 29 and 32 in a turbulent flow and counter-flow condition.

The contact material layer of the present embodiment consisted of two layers, but may also consist of a single layer or three or more layers. In this case also, the upper screen for confining the filter material in the given region may be omitted.

A comparison was made between a conventional gas and liquid contact process using a single stage Raschig ring and the process of the third embodiment in actually deodorizing waste gas containing reducing sulphur which was produced from a chemical plant. The gas and liquid contact process of the present embodiment achieved an approximately 99.9% removable ratio whereas the conventional gas and liquid contact process using Raschig ring achieved an approximately 98% removal ratio.

According to the gas and liquid contact process of the present invention, by contacting gas and liquid in the contact material layers filled with irregularly shaped pieces of foamed resin, pressure and turbulence are both generated, and the efficiency of the contact between the liquid and the gas was improved through improved persistence of fine gas bubbles. Further, foamed resin material has such a small specific weight and a high wear resistance that the contact material can be used for an extended period of time without losing its processing capability, and the maintenance of the system is therefore simplified.

Although the present invention has been described in terms of preferred embodiments thereof, it is obvious to a person skilled in the art that various alterations and modifications are possible without departing from the scope of the present invention which is set forth in the appended claims.

What we claim is:

1. A process for contacting gas and liquid in a hollow container having a sidewall, an outlet and an inlet for liquid and gas; the process comprising the steps of:
   providing a screen in the upper portion of the hollow container near the outlet, the screen extending generally downwardly and horizontally;
   charging the container with liquid;
   forming a generally horizontal layer, immediately below the screen, of irregularly shaped pieces of foamed plastic material having diameters in the range of about 1 mm to 50 mm, the layer being imemrsed in the liquid;
   charging the container simultaneously with liquid and gas travelling at a pressure above atmospheric in the same direction to form a liquid/gas mixture in the container having a plurality of fine bubbles that are maintained as the liquid/gas mixture passes through the layer that is maintained below the screen.

2. A process as defined in claim 1 in which said layer is 10% to 90% filled with said pieces of foamed plastic material and the charging of liquid and gas is at a pressure in a range of about 0.1 to 0.7 kgf/cm$^2$.

3. A process for contacting gas and liquid in a liquid/gas mixture in a hollow container having a sidewall, an outlet for the liquid/gas mixture and an inlet for liquid and gas; the process consisting of the steps of:
   providing a screen in the upper portion of the hollow container near the outlet, the screen extending generally downwardly and horizontally;
   charging the container with liquid;
   forming a generally horizontal liquid/gas mixture contact layer, immediately below the screen, of irregularly shaped pieces of foamed plastic material having diameters in the range of about 1 mm to 50 mm and having a specific gravity less than one, the layer being maintained below the screen;
   charging the container simultaneously with liquid and gas travelling in the same direction at a pressure above atmospheric in the range of about 0.1 to 0.6 kg f/cm$^2$ to form a liquid/gas mixture in the container having a plurality of fine bubbles that are maintained as the liquid/gas mixture passes through the layer.

4. A process for contacting gas and liquid in a hollow container having a sidewall, an outlet and an inlet for liquid and gas; the process comprising the steps of:
   charging the container with liquid;
   providing a screen in the upper portion of the hollow container near the outlet, the screen extending generally downwardly and horizontally;
   forming a generally horizontal contact layer, immediately below the screen, of irregularly shaped pieces of foamed plastic material having diameters in the range of about 1 mm to 50 mm, the contact layer being about 10 to 90% of the interior of the container and immersed in the liquid;
   charging the container simultaneously with liquid and gas travelling at a pressure above atmospheric in the same direction to form a liquid/gas mixture in the container having a plurality of fine bubbles that are maintained as the liquid/gas mixture passes through the layer that is maintained below the screen.

* * * * *